(12) United States Patent
Fukuyama et al.

(10) Patent No.: US 9,929,426 B2
(45) Date of Patent: Mar. 27, 2018

(54) FUEL CELL STACK

(71) Applicant: NISSAN MOTOR CO., LTD., Yokohama-shi, Kanagawa (JP)

(72) Inventors: Yosuke Fukuyama, Kanagawa (JP); Keita Iritsuki, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 596 days.

(21) Appl. No.: 14/394,365

(22) PCT Filed: Dec. 27, 2012

(86) PCT No.: PCT/JP2012/083790
§ 371 (c)(1),
(2) Date: Oct. 14, 2014

(87) PCT Pub. No.: WO2013/161130
PCT Pub. Date: Oct. 31, 2013

(65) Prior Publication Data
US 2015/0086893 A1    Mar. 26, 2015

(30) Foreign Application Priority Data

Apr. 25, 2012 (JP) .................. 2012-099661
May 23, 2012 (JP) .................. 2012-117777

(51) Int. Cl.
H01M 8/24       (2016.01)
H01M 8/04       (2016.01)
H01M 8/2465     (2016.01)
H01M 8/241      (2016.01)
H01M 8/248      (2016.01)
H01M 8/00       (2016.01)
H01M 8/0258     (2016.01)
H01M 8/0267     (2016.01)
H01M 8/04029    (2016.01)
H01M 8/04007    (2016.01)
H01M 8/1018     (2016.01)

(52) U.S. Cl.
CPC ......... *H01M 8/2465* (2013.01); *H01M 8/006* (2013.01); *H01M 8/0258* (2013.01); *H01M 8/0267* (2013.01); *H01M 8/04029* (2013.01); *H01M 8/04074* (2013.01); *H01M 8/241* (2013.01); *H01M 8/248* (2013.01); *H01M 2008/1095* (2013.01)

(58) Field of Classification Search
None
See application file for complete search history.

(56) References Cited

U.S. PATENT DOCUMENTS

2009/0136805 A1    5/2009  Sato et al.

FOREIGN PATENT DOCUMENTS

JP    4432518 B2      3/2010
JP    2012059383 A    3/2012

*Primary Examiner* — Ladan Mohaddes
(74) *Attorney, Agent, or Firm* — Young Basile Hanlon & MacFarlane, P.C.

(57) ABSTRACT

A fuel cell stack is formed by stacking unit cells and each unit cell is formed by sandwiching a membrane electrode assembly between a pair of separators having depression parts and protrusion parts. A cooling liquid flow space is formed between the unit cells, and a displacement absorption member which absorbs displacement between the unit cells C is disposed in the flow space. The displacement absorption member includes a spring function part having a free end and a fixed end, and an intrusion prevention means which prevents the free end of the spring function part from intruding into the depression part. A displacement absorption function between the unit cells is well maintained, while size reduction of the fuel cell stack is achieved.

23 Claims, 19 Drawing Sheets

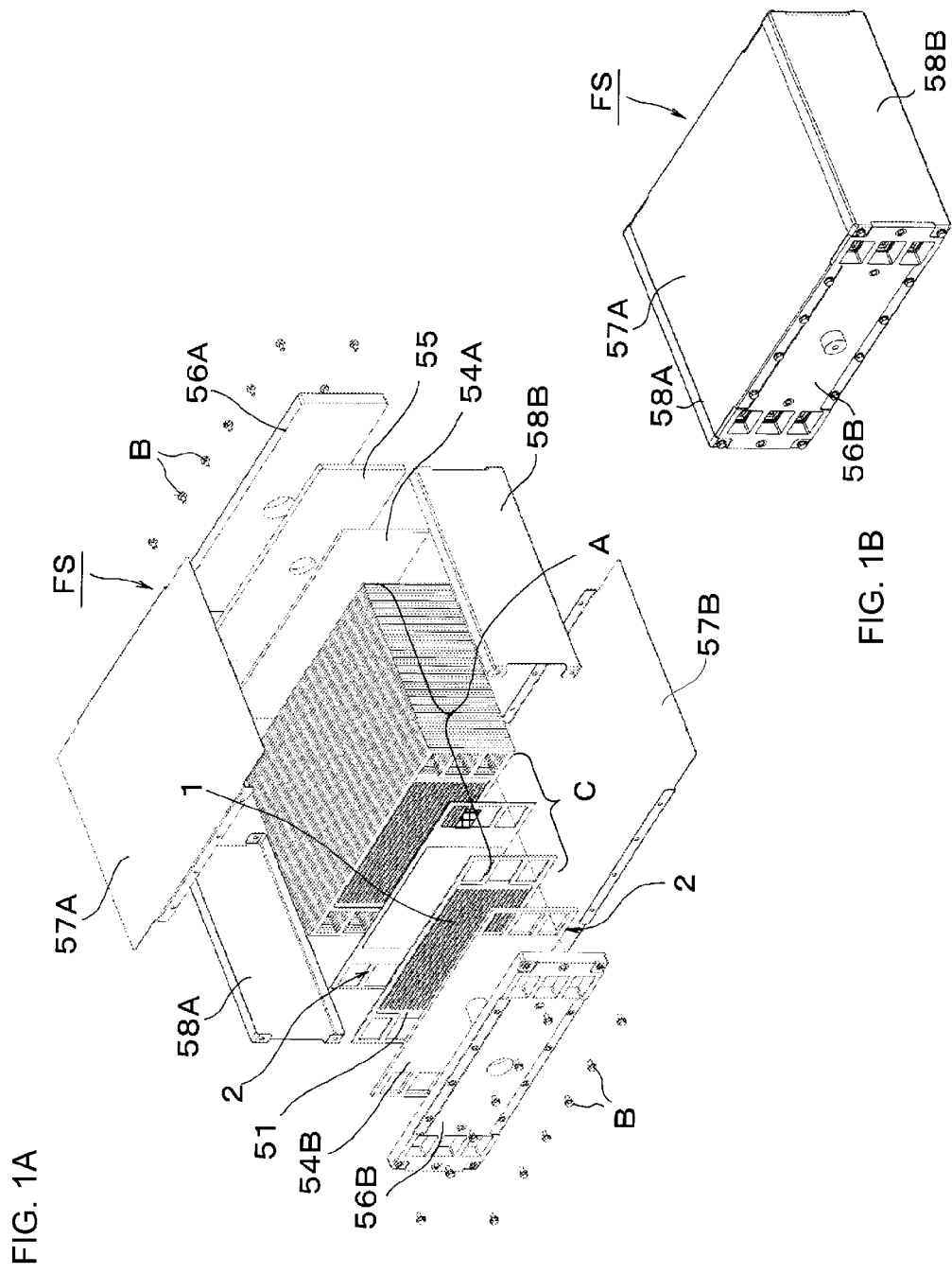

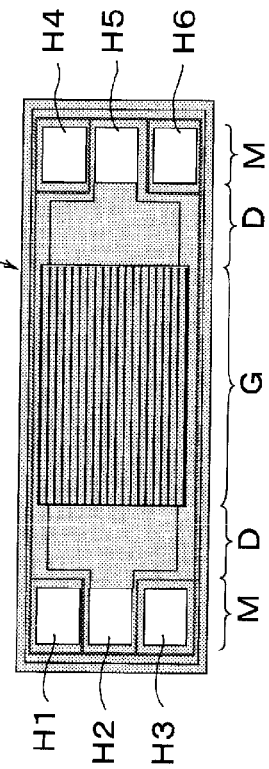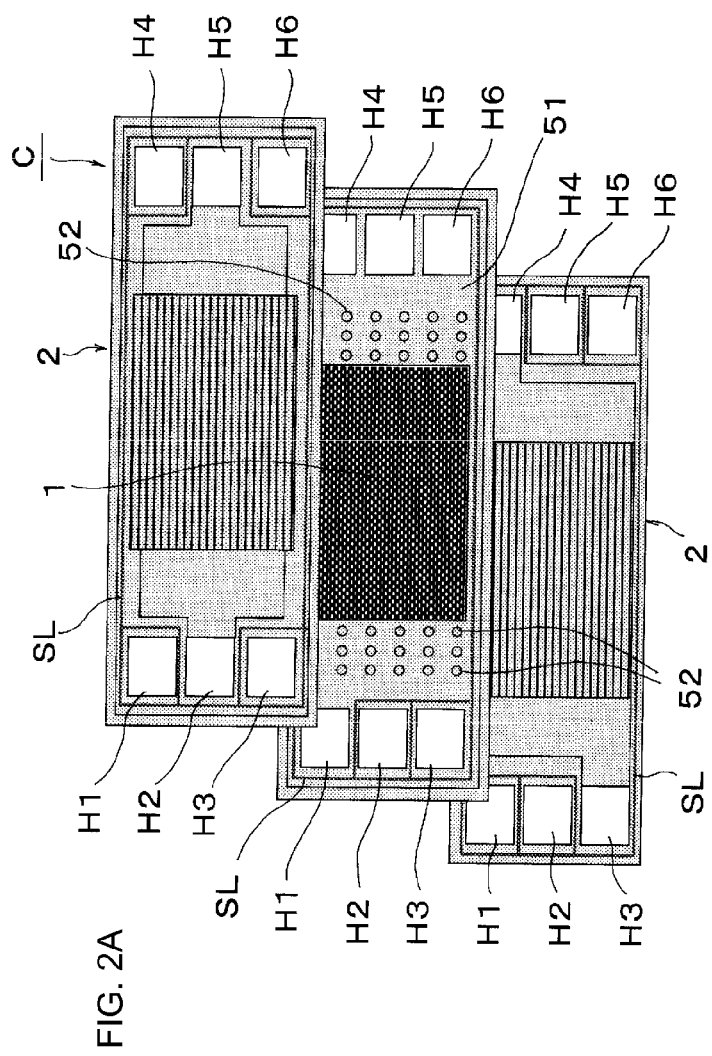
FIG. 2A
FIG. 2B

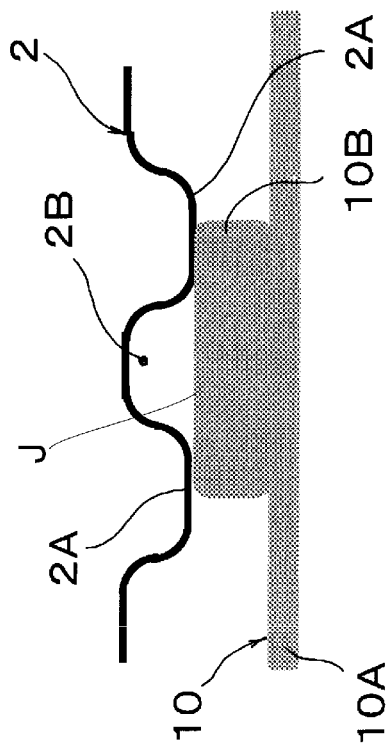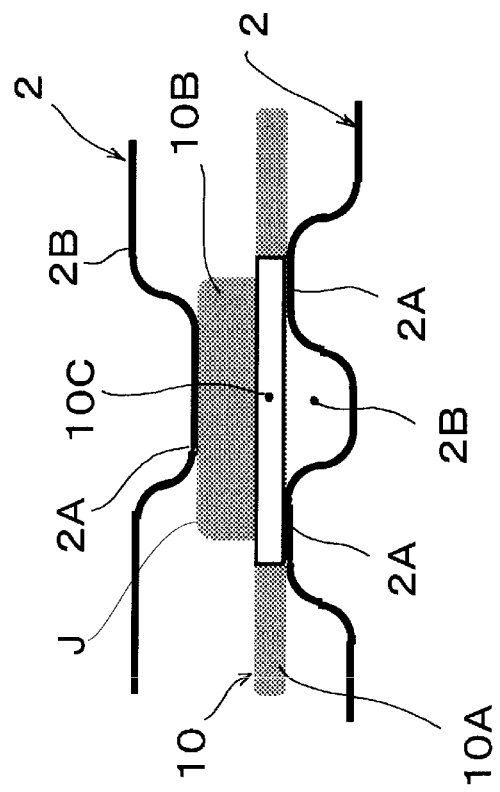
FIG. 6A
FIG. 6B

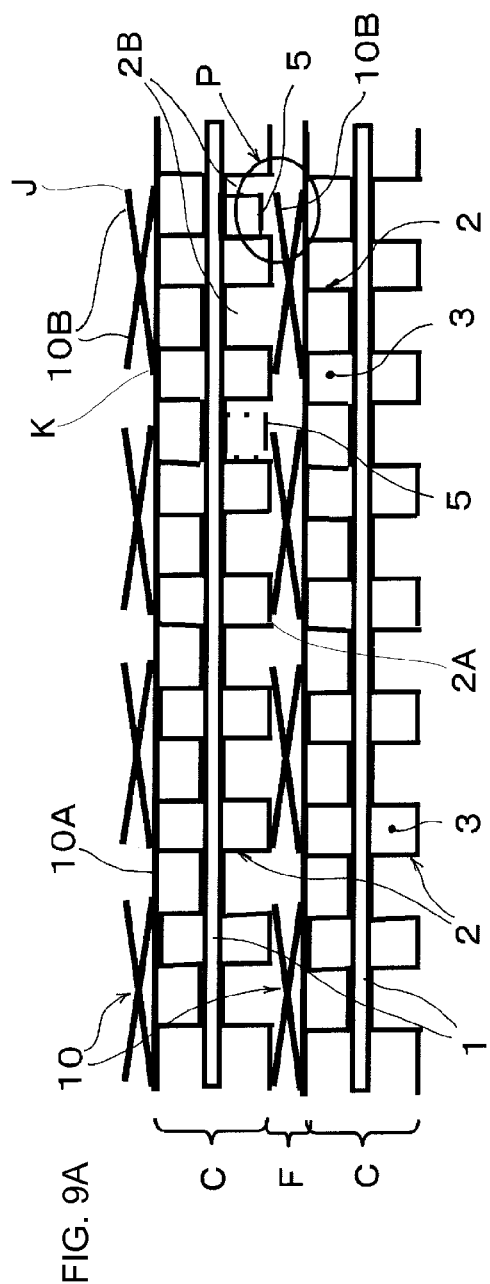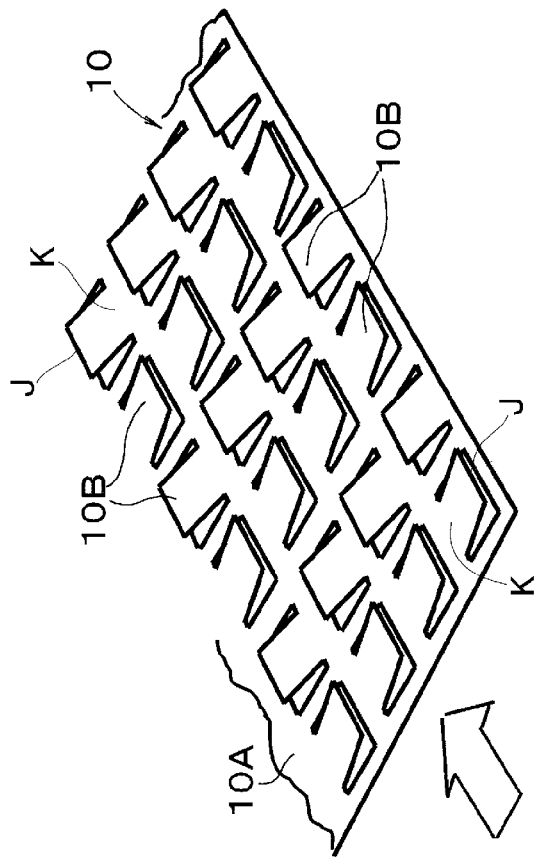
FIG. 9A
FIG. 9B

FUEL CELL STACK

CROSS REFERENCE TO RELATED APPLICATIONS

The present application claims priority to Japanese Patent Application Nos. 2012-099661, filed Apr. 25, 2012 and 2012-117777, filed May 23, 2012, each incorporated herein in its entirety.

TECHNICAL FIELD

The present invention relates to a fuel cell, such as a polymer electrolyte fuel cell (PEFC), and, in particular, relates to a fuel cell stack having a structure in which a cooling liquid flows between stacked unit cells.

BACKGROUND

Conventionally, as a fuel cell stack as described above, there is one disclosed as a fuel battery in Japanese Patent (Granted) Publication No. 4432518, for example. The fuel battery disclosed in Japanese Patent (Granted) Publication No. 4432518 is one in which a plurality of fuel cells are stacked. The fuel cell includes, on both sides of an MEA (membrane electrode assembly), a hydrogen electrode having a shape with protrusions and depressions in cross-section and an oxygen electrode that includes a drainage layer likewise having a shape with protrusions and depressions in cross-section. It also includes a planar plate separator that respectively forms a hydrogen passage and an oxygen passage between the hydrogen electrode and the oxygen electrode. Furthermore, the fuel cell includes a coolant passage portion on the oxygen electrode side.

The coolant passage portion includes two planar plate separators, a pre-load plate sandwiched between them. The spaces between both planar plate separators are made passages for cooling water. The pre-load plate has a wave-shaped cross-section, and distributes a locally generated load caused by a form error in the component parts of the fuel cell. The load is thereby evenly applied to each of the component parts.

SUMMARY

When a fuel cell stack of this type is used as a power source in vehicles such as automobiles, miniaturization is very important since the installation space is limited to a small space. However, in the conventional fuel cell stack (a fuel battery) mentioned above, since the unit cell (fuel cell) represents a combination of electrodes having a shape with protrusions and depressions in cross-section, planar plate separators, and a pre-load plate, it is difficult to maintain a displacement absorption function while making the unit cell thinner, making miniaturization of the fuel cell stack difficult.

The present invention has been made in view of the circumstances described above, and the object is to provide a fuel cell stack having a structure in which a cooling liquid flows between stacked unit cells, wherein a displacement absorption function between the unit cells are well maintained, while miniaturization of the fuel cell stack can be achieved.

A fuel cell stack according to the present invention has a structure that is formed by stacking unit cells, and the unit cell is formed by sandwiching a membrane electrode assembly between a pair of separators having depression parts and protrusion parts.

Further, the fuel cell stack has a cooling liquid flow space between the unit cells, and a displacement absorption member which absorbs displacement between the unit cells are disposed in the flow space. The displacement absorption member includes a spring part having a free end and a fixed end, and an intrusion prevention part, which prevents the free end of the spring part from intruding into the depression part, is provided. The configuration described above represents the means to solve the conventional problems.

A fuel cell stack according to the present invention has a configuration, in which a cooling liquid flows between the stacked unit cells, and well maintains a displacement absorption function between the unit cells, while miniaturization of the fuel cell stack can be achieved.

BRIEF DESCRIPTION OF DRAWINGS

FIG. 1A is a perspective view of a disassembled state of a first embodiment of a fuel cell stack according to the present invention, and FIG. 1B is a perspective view after assembly;

FIG. 2A is a plan view of a disassembled state of the configuration of a unit cell, and FIG. 2B is a plan view after assembly;

FIGS. 6A and 6B are respectively cross-sectional views for explaining a third embodiment of the fuel cell stack according to the present invention;

FIG. 9A is a cross-sectional view for explaining a sixth embodiment of the fuel cell stack according to the present invention, and FIG. 9B is a perspective view of a displacement absorption member;

DESCRIPTION OF EMBODIMENTS

First Embodiment

Figure 3A:
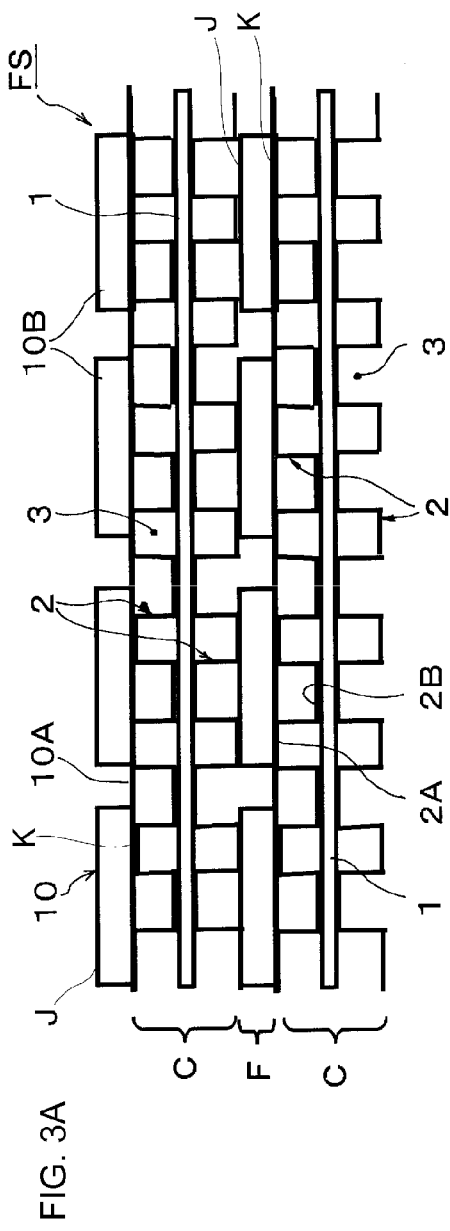
FIG. 3A is a cross-sectional view in the width direction of the protrusions and the depressions of the fuel cell stack.

The fuel cell stack FS shown in FIG. 1 has unit cells C as shown in FIG. 1A as power generating components. An end plate 56A is provided on one end portion in the stacking direction (the right end portion in FIG. 1) of a stacked body A via a current collector 54A and a spacer 55, and the stacked body A is formed by stacking the unit cells C. An end plate 56B is provided on the other end portion via a current collector 54B. Furthermore, the fuel cell stack FS is provided with fastening plates 57A and 57B on both faces (the upper and lower faces in FIG. 1) representing the longer edge sides of the unit cells C of the stacked body A. Reinforcing plates 58A and 58B are also provided on both faces representing the shorter edge sides.

Further, in the fuel cell stack FS, the fastening plates 57A and 57B and the reinforcing plates 58A and 58B are joined with both end plates 56A and 56B by bolts B. In this manner, the fuel cell stack FS is formed in a structure integrated with a case as shown in FIG. 1B. Thereby, the stacked body A is bound and compressed in its stacking direction, a predetermined contact surface pressure is applied to each unit cell C, and, as a result, a gas sealing property, conductivity, and the like, are well maintained.

As shown in FIG. 2, the fuel cell C has a structure in which a membrane electrode assembly 1 is sandwiched between a pair of separators 2 and 2. Furthermore, the membrane electrode assembly 1, shown in the figure, has a resin frame 51 at the outer periphery thereof, the resin frame 51 being integrally formed with the electrode assembly 1.

The membrane electrode assembly 1 is generally referred to as an MEA (Membrane Electrode Assembly). For example, it has a structure in which an electrolyte layer composed of a polymer electrolyte is sandwiched between a pair of electrode layers, namely an air electrode layer (cathode) and a fuel electrode layer (anode). In the membrane electrode assembly 1, the air electrode layer is supplied with a cathode gas (an oxygen-containing gas or air), while the fuel electrode layer is supplied with an anode gas (a hydrogen-containing gas). Consequently, power is generated by an electrochemical reaction. The membrane electrode assembly 1 also includes those having a gas diffusion layer composed of carbon paper, a porous body, and the like, on the surface of the air electrode layer and the fuel electrode layer.

The frame 51 is integrally formed with the membrane electrode assembly 1 by resin molding (for example, injection molding). In this embodiment, it has a rectangular shape with the membrane electrode assembly 1 in the center. Furthermore, the frame 51 has manifold holes H1 to H6, three of which are respectively disposed on each of the end portions. The region from the manifold holes to the membrane electrode assembly 1 is a diffuser portion D. The frame 51 and both separators 2 and 2 are a rectangular shape with each having approximately equal vertical and horizontal dimensions.

Further, the frame 51 has a plurality of circular protrusions 52, which are disposed vertically and horizontally in the diffuser portion D. These protrusions 52 maintain a reaction gas flow space when the unit cells C are displaced in their thickness direction due to temporal change of the membrane electrode assembly 1, and the like, by making contact with the separators 2 and 2.

The separators 2 are, for example, made of stainless steel, and they are formed such that at least the central section corresponding to the membrane electrode assembly 1 has a shape with protrusions and depressions in cross-section. The separators 2 continuously have the shape with protrusions and depressions in cross-section along the longer edge direction, that is to say, in the cooling liquid flow direction (the horizontal direction in FIG. 2). Therefore, wave-shaped depression parts form gas passages (reference sign 3 in FIG. 3) for the anode gas and the cathode gas between the membrane electrode assembly 1 and the separator 2. Furthermore, each of the separators 2 have manifold holes H1 to H6 on both end portions, which are equivalent to the manifold holes H1 to H6 of the frame 51.

The frame 51, the membrane electrode assembly 1, and both separators 2 and 2 described above are superposed to form a unit cell C. At this time, particularly as illustrated in FIG. 2B, the unit cell C includes a power generation part G at the center, which represents a region of the membrane electrode assembly 1. Further, on both sides of the power generation part G, manifold parts M, which supply and discharge the reaction gas, and the diffuser parts D, which represent a reaction gas flow region ranging from each of the manifold parts M to the power generation part G, are provided.

In one manifold part M shown on the left side of FIG. 2B, the manifold holes H1 to H3 are respectively for supplying the cathode gas (H1), the cooling liquid (H2), and the anode gas (H3). They communicate with each other in the stacking direction to form the respective passages. Furthermore, in the other manifold part M shown on the right side of FIG. 2B, the manifold holes H4 to H6 are respectively for discharging the anode gas (H4), the cooling liquid (H5), and the cathode gas (H6). They communicate with each other in the stacking direction to form the respective passages. Some or all of the manifold holes for supply and discharge may take a reversed positional relationship.

Further, as shown in FIG. 2, the unit cell C is provided with gas seals SL between the edges of the frame 51 and the separators 2, and around the manifold holes H1 to H6. Furthermore, in a state where a plurality of unit cells C are stacked, gas seals SL are also provided between the unit cells C, that is to say, between adjacent separators 2. This embodiment has, as mentioned below, a structure in which a cooling liquid flows between adjacent separators 2 and 2.

The above described gas seals SL gas-tightly separate the flow area of the cathode gas, the anode gas and the cooling liquid respectively between individual layers. They are provided with openings at appropriate positions in the periphery of the manifold holes H1 to H6 such that the predetermined fluids flow between the layers.

A plurality of unit cells C having the structure described above are stacked to produce the fuel cell stack FS shown in FIG. 1. As shown in FIG. 3A, the fuel cell stack FS has a cooling liquid flow space F between adjacent unit cells C. It also includes a displacement absorption member 10 disposed in the flow space F, which absorbs displacement between the unit cells C.

Here, the separators 2 and 2 continuously have, as mentioned above, a shape with protrusions and depressions in cross-section in the cooling liquid flow direction (the direction of arrow A in FIG. 3B), and gas passages 3 and 3 for the anode gas and the cathode gas are formed by wave-shaped depression parts between the membrane electrode assembly 1 and the separator 2. The shape with protrusions and depressions in cross-section are formed on the separators 2 shown in the figure by alternatingly disposing protrusion parts 2A and depression parts 2B having a square shape in cross-section. Therefore, the upper surfaces of the protrusion parts 2A are planar.

Further, in the fuel cell stack FS, the cooling liquid flow direction in the flow space F (the direction of arrow A in FIG. 3), and the flow direction of the anode gas (the direction of arrow B in FIG. 3) and the flow direction of the cathode gas (the direction of arrow C in FIG. 3) in the gas passages 3 and 3, are the same.

The separator 2 has a front/back reversible shape. Therefore, in the separator 2, the protrusion parts 2A, which protrude on the flow space F side, corresponds to depression parts on the opposite side thereof, while the depression parts 2B, which are opened to the flow passage space F side corresponds to protrusion parts on the opposite side thereof. Such a separator 2, for example, can be manufactured by pressing, and has an enhanced mechanical strength as a result of the protrusions and depressions thereof. Furthermore, it is possible to achieve a thinner membrane electrode assembly 1 and a thinner unit cell C, since flow passages can be formed on both sides of the separator 2.

Gas seals are appropriately provided at the outer periphery between the membrane electrode assembly 1 and each of the separators 2, and between adjacent unit cells C, that is to say, in the flow passage space F. Furthermore, the anode gas, the cathode gas, and the cooling liquid flow between the layers through supply passages and discharge passages not shown in the Figures.

The displacement absorption member 10 is schematically a member, whose contact portion with the separator 2 moves in the in-plane direction (the horizontal direction in FIG. 3B) with a deformation in the thickness direction. The displacement absorption member 10 is disposed such that the movement direction of the contact portion corresponds to the continuous direction of the protrusions and depressions of the separator 2. The continuous direction of the protrusions and depressions is not the direction along which the protrusions and the depressions are alternating, but the direction in which the cross-section of the protrusions and depressions are continuous (the longitudinal direction of the protrusion parts 2A and the depression parts 2B).

Furthermore, as described below, the displacement absorption member 10 includes a spring function part, or spring part, 10B having a free end J and a fixed end K. The displacement absorption member 10 is disposed such that the movement direction of the free end J of the spring function part 10B matches to the continuous direction of the depression part 2B of the separator 2 (the horizontal direction in FIG. 3B), and the free end J contacts with the protrusion part 2A of the separator 2. Further, the displacement absorption member 10 includes an intrusion prevention means or part, which prevents the intrusion of the free end J of the spring function part 10B into the depression part 2B.

Figure 3B:
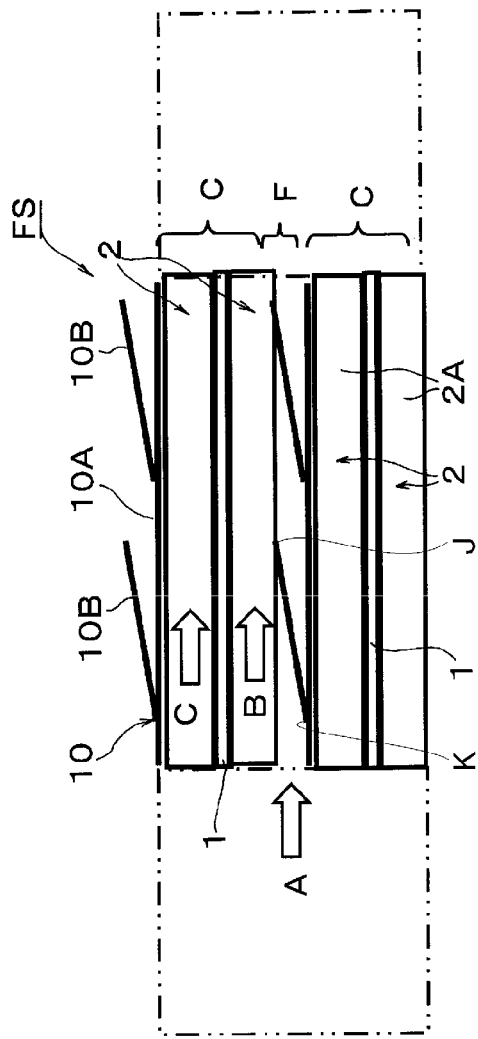
FIG. 3B is a cross-sectional view in the continuous direction of the protrusions and the depressions.
Figure 4A:
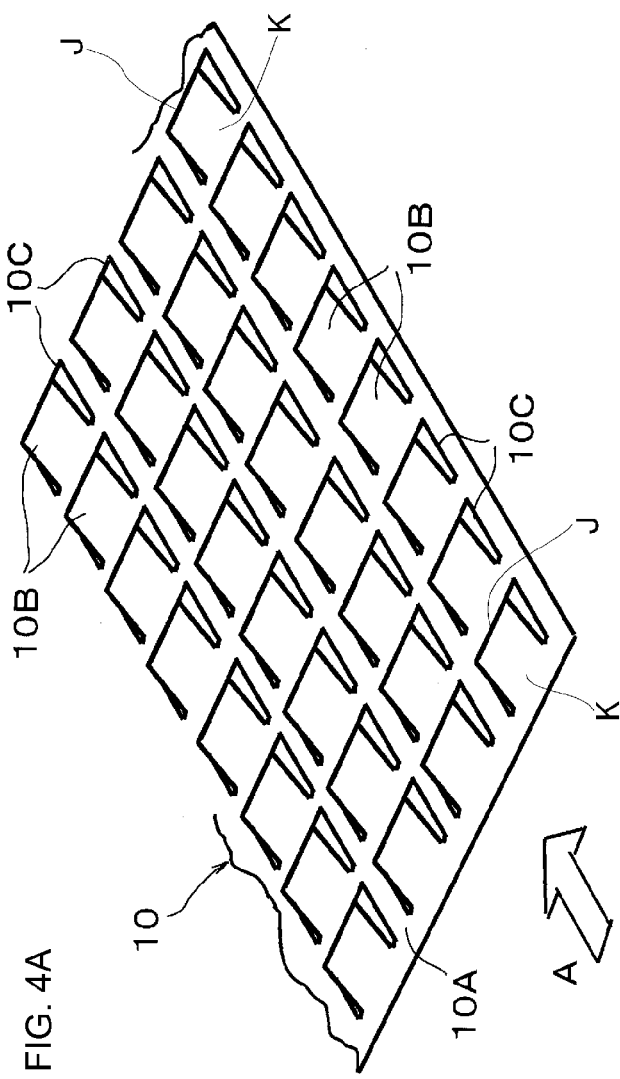
FIG. 4A is a perspective view for explaining a displacement absorption member.

As also shown in FIG. 4A, the displacement absorption member 10 of this embodiment has a thin metallic plate as a raw material. Furthermore, it has a conductivity to also serve as a connector between the unit cells C, and represents a structure, in which a plurality of the spring function parts 10B are vertically and horizontally disposed on one side of a substrate 10A. Consequently, the substrate 10A of the displacement absorption member 10 contacts with one separator 2 (the separator on the lower side of the unit cell C in FIG. 3) of a pair of separators 2 and 2, which face each other via the flow space F, and the spring function part 10B contacts with the other separator 2 (the separator on the upper side of the unit cell C in FIG. 3).

Figure 4B:
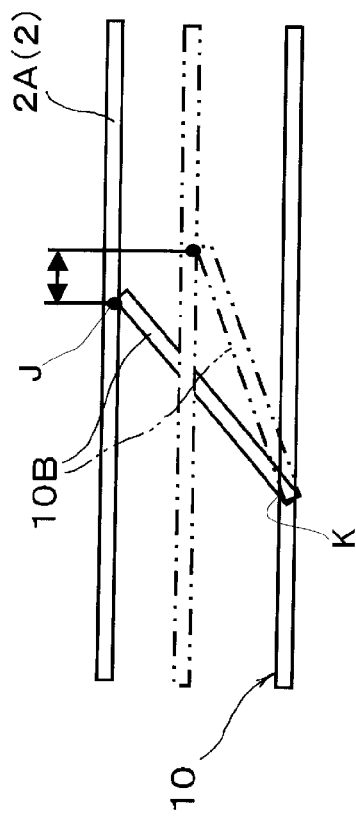
FIG. 4B is a side view for explaining movement of a spring function part.

The spring function part 10B has a tongue-shaped cantilever structure, in which a bottom end is the fixed end K to the substrate 10A, and a top end side is the free end J. As shown in FIG. 4B, the spring function part 10B is such that its angle with the substrate 10A changes with a deformation in the thickness direction. Furthermore, the top end of the free end J, which contacts with the separator 2, is displaced in the continuous direction of the protrusions and depressions representing the in-plane direction indicated by the arrows.

Moreover, the spring function part 10B of the displacement absorption member 10 is formed by raising a cut portion of the substrate 10A. Consequently, the substrate 10A has an opening 10C on the lower side of each spring function part 10B, the opening being formed by raising the spring function part 10B cut from the substrate 10A. Further, in the displacement absorption member 10, at least one of the spring function parts 10B is disposed in a state where the free end J is directed to the downstream side of the cooling liquid flow direction. In the example shown in the figure, all of the spring function parts 10B are directed to the same direction.

In the fuel cell stack FS including the configuration described above, the unit cells C are a combination of separators 2 having a shape with protrusions and depressions in cross-section, and the displacement absorption members 10. Therefore, the gas passages 3 and the cooling liquid flow space F are efficiently disposed with a predetermined passage area, and a thinner unit cell C is achieved.

Furthermore, in the fuel cell stack FS, displacement between the unit cells C are absorbed by the displacement absorption members 10. For this purpose, in the fuel cell stack FS, the orientation of the spring function parts 10B of the displacement absorption member 10 corresponds to the continuous direction of the protrusions and depressions of the separators 2. Moreover, the upper surfaces of the protrusion parts 2A of the separators 2, with which the spring function parts 10B contact, are planar.

Consequently, in the fuel cell stack FS, even if the contact portion between the free end J of the spring function part 10B and the separator 2 moves with a deformation of the displacement absorption member 10 in the thickness direction, as shown in FIG. 3B, the free end J of the spring function part 10B constantly contacts with the upper surface of the protrusion part 2A, and does not fall into the depression part 2B. Therefore, the displacement absorption function of the displacement absorption members 10 sufficiently works. That is to say, in this embodiment, the protrusion part 2A of the separator 2 corresponds to the intrusion prevention means, which prevents the free end J of the spring function part 10B from intruding into the depression part 2B. Furthermore, in the fuel cell stack FS, the free end J of the spring function part 10B and the protrusion part 2A of the separator 2 are brought into area contact with each other. Therefore, the contact resistance between the separator 2 and the displacement absorption member 10 can also be reduced.

In this manner, the fuel cell stack FS has a structure, in which a cooling liquid flows between stacked unit cells C, and well maintains a function to absorb displacement between the unit cells C, while size reduction of the fuel cell stack is achieved.

Moreover, in the fuel cell stack FS, the displacement absorption member 10 is disposed in a state that the free end J of each spring function part 10B is directed to the downstream side of the cooling liquid flow direction, in the flow space F. Therefore, the cooling liquid flows more easily, and pressure loss in the cooling liquid can be reduced.

Further, in the fuel cell stack FS, the cooling liquid flow direction (the direction of arrow A in FIG. 3) in the flow space F is the same as the gas flow direction (the direction of arrows B and C in FIG. 3) in the gas passages 3 and 3. In particular, the cooling liquid flow direction (the direction of arrow A in FIG. 3) is made the same as the anode gas flow direction (direction of arrow B). Therefore, temperature control of the reaction surface of the membrane electrode assembly 1, that is to say, control of the temperature field in the gas flow direction at the reaction surface is readily made.

FIG. 5 to FIG. 8 illustrate a fuel cell stack according to second to fifth embodiments of the present invention. In the following embodiments, the same components as those of the first embodiment are referred to by the same reference signs, and detailed descriptions are omitted.

Second Embodiment

Figure 5A:
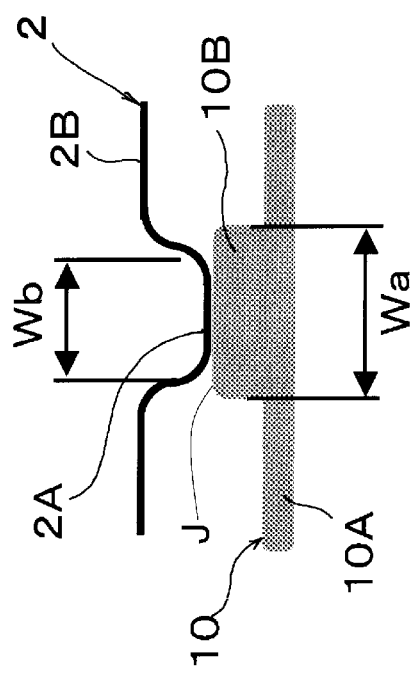
FIGS. 5A and 5B are respectively cross-sectional views for explaining a second embodiment of the fuel cell stack according to the present invention.

A displacement absorption member 10 of a fuel cell stack, shown in FIG. 5A, has a spring function part 10B, whose free end J has larger width Wa than the width Wb of a protrusion part 2A of a separator 2, with which the above spring function part 10B contacts.

In the fuel cell stack with the configuration described above, in addition to being able to obtain the same effects as the previous embodiment, the free end J of the spring function part 10B always contacts with the upper surface of the protrusion part 2A, thereby the free end J is prevented from falling into the depression part 2B. Furthermore, a large electrical contact area can be obtained.

Figure 5B:
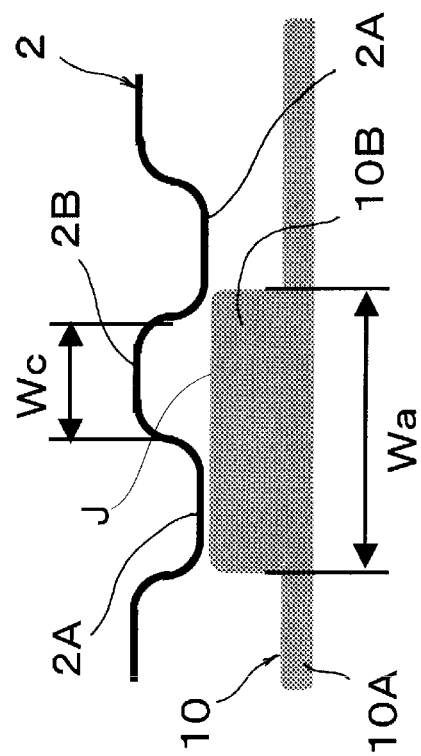

A displacement absorption member 10 of a fuel cell stack, shown in FIG. 5B, has a spring function part 10B, whose free end J has larger width Wa than the width Wc of a depression part 2B of a separator 2, with which the above spring function part 10B contacts.

In the fuel cell stack with the configuration described above, in addition to being able to obtain the same effects as the previous embodiment, the free end J of the spring function part 10B always contacts with the upper surface of the protrusion part 2A, thereby the free end J is prevented from falling into the depression part 2B. Furthermore, a large electrical contact area can be obtained.

Third Embodiment

A displacement absorption member 10 of a fuel cell stack, shown in FIG. 6A, has a spring function part 10B, whose free end J contacts with a plurality of protrusion parts 2A of a separator 2, with which the above spring function part 10B contacts. In the example shown in the figure, the free end J of the spring function part 10B contacts with two adjacent protrusion parts 2A and 2A.

In a fuel cell stack with the configuration described above, in addition being able to obtain the same effects as the previous embodiments, pressure loss in the cooling liquid can be reduced. That is, in the fuel cell stack, as described above, the flow of the cooling liquid is promoted, by directing each free end J of the spring function part 10B to the downstream side of the cooling liquid flow direction. However, the interference in the cooling liquid flow by the spring function part 10B itself is inevitable.

Therefore, in the fuel cell stack, a passage formed by the depression part 2B of the separator 2 is ensured at the portion where the spring function part 10B is disposed, by allowing the free end J of the spring function part 10B contact with a plurality of protrusion parts 2A of the separator 2. That is to say, the depression part 2B that lies between a plurality of the protrusion parts 2A and 2A, with which the spring function part 10B contacts, is secured as a passage at the portion where the above spring function part 10B is disposed. Consequently, in the fuel cell stack, by distributing the cooling liquid to the portion where the spring function part 10B is disposed, flow at the above portion is promoted, thereby reducing the pressure loss in the cooling liquid as a whole.

In a displacement absorption member 10 of a fuel cell stack shown in FIG. 6B, a substrate 10A of the displacement absorption member 10 has an opening 10C on the lower side of each spring function part 10B, as described above referring to FIG. 4A. Further, in the fuel cell stack, a depression part 2B of a separator 2, with which the substrate 10A contacts, communicates with the opening 10C.

In the fuel cell stack described above, a passage formed by the depression part 2B and the opening 10C is ensured at the portion where the spring function part 10B is disposed, on the side of the separator 2, with which the substrate 10A contacts. Consequently, in the fuel cell stack, by distributing the cooling liquid to the portion where the spring function part 10B is disposed, flow at the above portion is promoted, thereby reducing the pressure loss in the cooling liquid as a whole.

By combining the embodiments shown in FIGS. 6A and 6B, a passage is formed by the upper and lower depression parts 2B and 2B and the opening 10C, in the separators 2 and 2 on both the upper and lower sides of the displacement absorption member 10. Therefore, flow at the portion where the spring function part 10B is disposed is further promoted.

Fourth Embodiment

Figure 7:
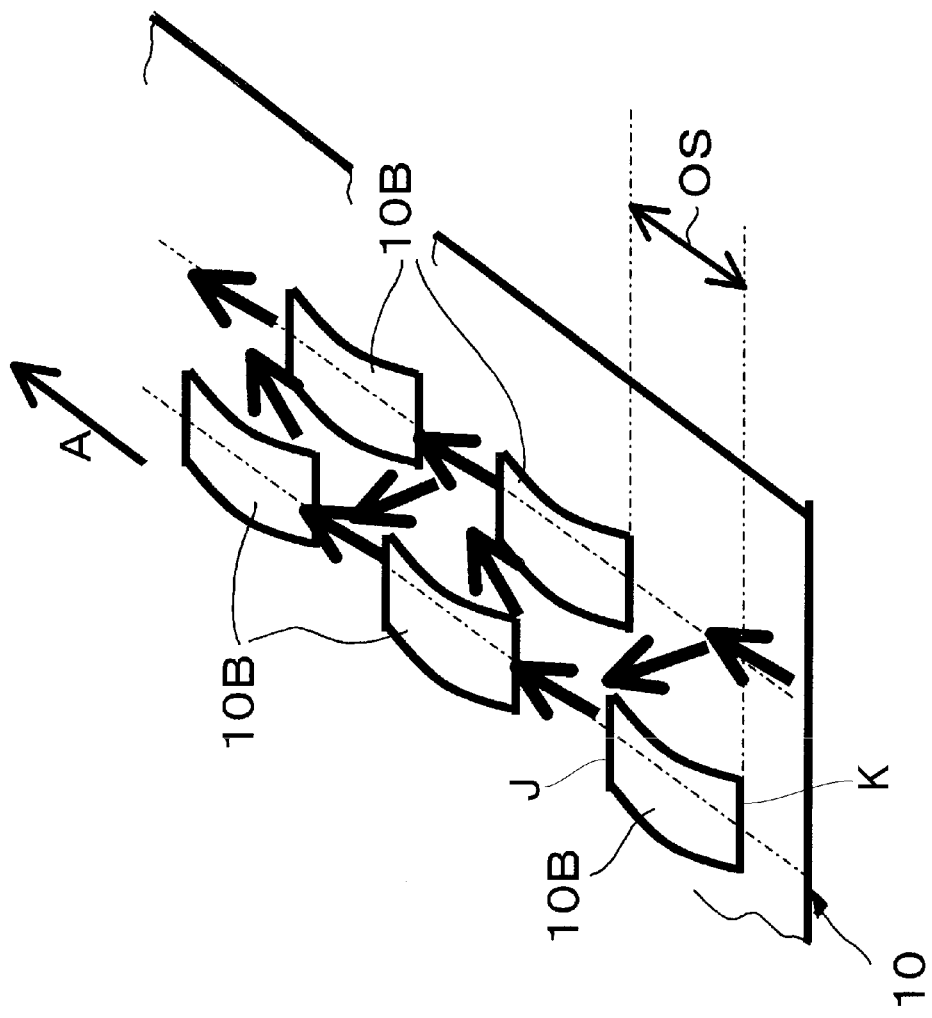
FIG. 7 is a perspective view for explaining a fourth embodiment of the fuel cell stack according to the present invention.

A displacement absorption member 10 of a fuel cell stack, shown in FIG. 7, has spring function parts 10B arranged on a substrate 10A in the continuous direction of protrusions and depressions of a separator 2 (the upper direction in the figure), and also in the width direction of the separator 2 (the horizontal direction in the figure) that intersects the above continuous direction. The spring function parts 10B adjacent to each other in the width direction are shifted (or offset) in the continuous direction of the protrusions and depressions (arrow OS). The amount of the shift (or offset) shown in the figure is approximately equivalent to a single spring function part 10B. The continuous direction of the protrusions and depressions of the separator 2 is the same as the cooling liquid flow direction.

In the fuel cell stack described above, as indicated by the arrows in FIG. 7, cooling liquid flows in the in-plane direction such that it is diverted left and right around the spring function parts 10B. Therefore, pressure loss in the cooling liquid is reduced, because there are fewer points at which the cooling liquid stagnates. Furthermore, by combining the fuel cell stack described above with, for example, the structure of the displacement absorption member 10 and the separator 2 shown in FIG. 6, the flow in the in-plane direction and in the thickness direction is reduced, thereby significantly reducing pressure loss in the cooling liquid as a whole.

Fifth Embodiment

Figures 8A, 8B:
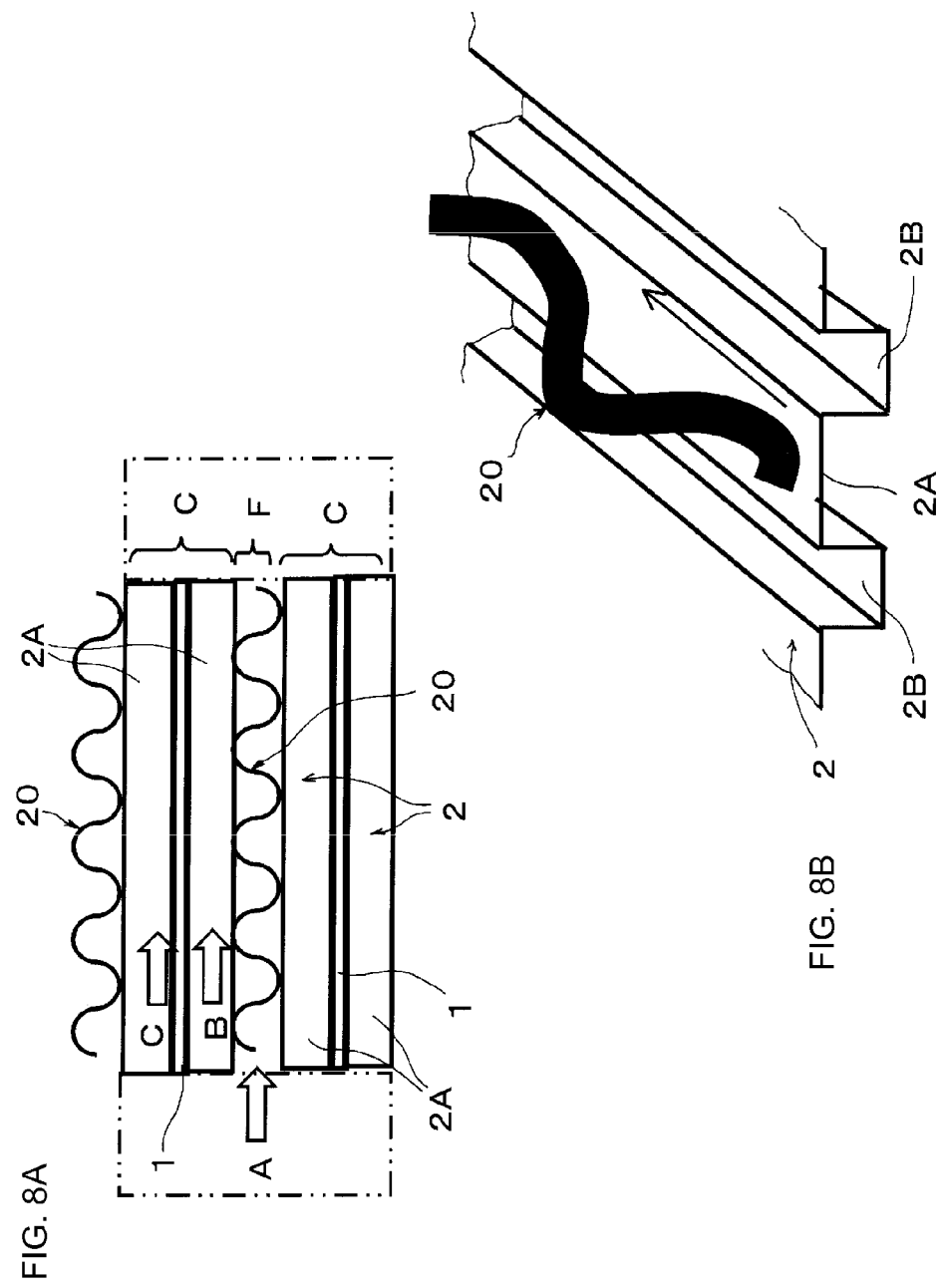
FIGS. 8A and 8B are respectively a cross-sectional view and a perspective view in the continuous direction of the protrusions and the depressions for explaining a fifth embodiment of the fuel cell stack according to the present invention.

A fuel cell stack FS shown in FIGS. 8A and 8B employs a displacement absorption member 20 with a wave shape in cross-section, while the previous embodiments employ the displacement absorption member 10 with a plurality of spring function parts 10B disposed on one side of the substrate 10A. The contact portion of the displacement absorption member 20 with a separator 2 still moves in the in-plane direction (propagation direction of the wave shape) with a deformation in the thickness direction. In FIG. 8B, only the wave shape of the displacement absorption member 20 is illustrated. With this displacement absorption member 20, for example, one end portion or the central portion can be fixed to another member to provide the fixed end. In this case, when one end portion serves as the fixed end, then the other end portion serves as the free end, and when the central portion serves as the fixed end, then both end portions serve as the free ends.

In the above described fuel cell stack FS, a cooling liquid flow space F is formed between adjacent unit cells C, and the displacement absorption member 20 described above is provided in the flow space F. The separator 2 continuously has the shape with protrusions and depressions in cross-section in the cooling liquid flow direction (the horizontal direction in FIG. 3A). Further, the displacement absorption member 20 is disposed such that the movement direction of the contact portion (the movement direction of the free end) corresponds to the continuous direction of the protrusions and depressions of the separator 2, that is to say, such that the traveling direction of the wave shape corresponds to the continuous direction of the protrusions and depressions of the separator 2, as shown in FIG. 8A. The displacement absorption member 20 makes contact with the protrusion parts 2A of the separators 2 above and below, respectively.

In the same manner as the previous embodiments, the fuel cell stack having the displacement absorption member 20 described above also has a structure in which cooling liquid flows between stacked unit cells C, and well maintains a function to absorb displacement between the unit cells C, while size reduction of the fuel cell stack is achieved.

FIG. 9 to FIG. 19 respectively illustrate a fuel cell stack according to sixth to fifteenth embodiments of the present invention. The same components as those of the previous embodiments are referred to by the same reference signs, and detailed descriptions are omitted. Furthermore, in FIG. 10 to FIG. 16, only a spring function part 10B of a displacement absorption member 10 is shown.

Sixth Embodiment

In a fuel cell stack shown in FIG. 9, a displacement absorption member 10 is schematically a member, whose contact portion with a separator 2 moves in the in-plane direction (the horizontal direction in FIG. 9A) with a deformation in the thickness direction. The displacement absorption member 10 is disposed such that the movement direction of the contact portion corresponds to the direction of the arrangement of protrusions and depressions of the separators 2.

Furthermore, the displacement absorption member 10 includes a spring function parts 10B having a free end J and a fixed end K. The displacement absorption member 10 is disposed such that the movement direction of the free end J of the spring function part 10B matches to the direction orthogonal to the continuous direction of the depression part 2B of the separator 2 (the horizontal direction in FIG. 9), and the free end J contacts with the protrusion part 2A of the separator 2. Further, the displacement absorption member 10 includes an intrusion prevention means, which prevents the intrusion of the free end J of the spring function part 10B into the depression part 2B.

The intrusion prevention means of this embodiment is, as described below, formed in a depression part 2B selected from the depression parts 2B on the flow space F side of the separator 2, and protrudes on the flow space F side to serve as a retaining portion that inhibits the falling of the displacement absorption member 10.

As shown in FIG. 9B, the displacement absorption member 10 has a thin metallic plate as a raw material. Furthermore, it has a conductivity to also serve as a connector between the unit cells C, and represents a structure, in which a plurality of the spring function parts 10B are vertically and horizontally disposed on one side of a substrate 10A. The spring function part 10B has a tongue-shaped cantilever structure in which a bottom end is the fixed end K to the substrate 10A, and a top end side is the free end J. The spring function part 10B is formed by raising a portion cut from the substrate 10A.

In the displacement absorption member 10 shown in the figure, when the cooling liquid flow direction indicated by the arrow in FIG. 9B represents the longitudinal direction, then laterally disposed rows with free ends J on the right side, and laterally disposed rows with free ends J on the left side, are alternatingly disposed in the longitudinal direction. When the displacement absorption member 10 undergoes a deformation in the thickness direction, the angle of the spring function part 10B changes. Therefore, the contact portion of the free end J moves in the direction of the arrangement of the protrusions and depressions of the separator 2.

In the above described combination of the separator 2, having the shape with protrusions and depressions in cross-section, and the displacement absorption member 10, the free end J of the spring function part 10B can fall into the depression part 2B of the separator 2, as shown by the arrow P in FIG. 9A. In this case, the falling of the free end J is resolved by matching the position of the protrusion part 2A of the separator 2 and the spring function part 10B of the displacement absorption member 10. However, it is very difficult to match the positions of the protrusion part 2A and the spring function part 10B from a design perspective, respectively fulfilling an appropriate flow rate of the anode gas or the cathode gas, an appropriate flow rate of the cooling liquid, and appropriate spring characteristics of the displacement absorption member 10.

Figure 10:
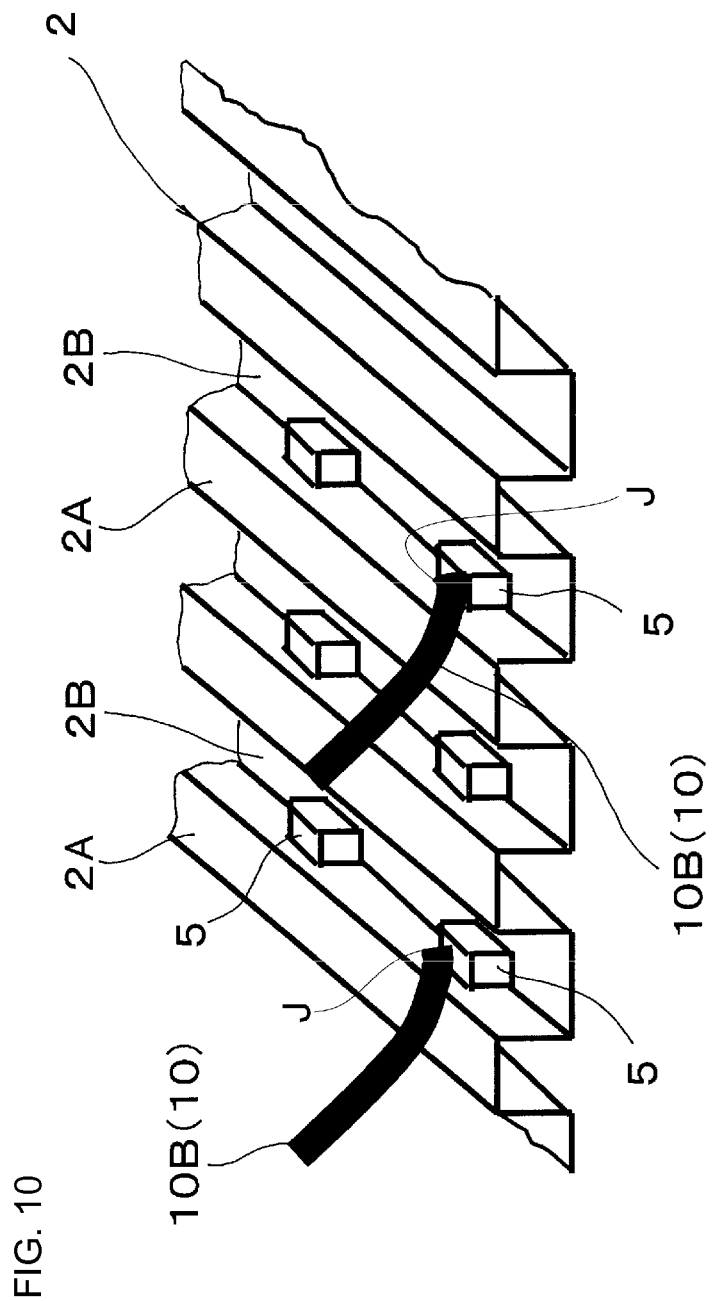
FIG. 10 is a perspective view for explaining the sixth embodiment of the fuel cell stack together with FIG. 9.

Therefore, as shown in FIG. 10, in the fuel cell stack FS, the separator 2 includes a retaining portion (intrusion prevention means) 5 in a depression part 2B selected from the depression parts 2B on the flow space F side, said retaining portion protruding on the flow space F side to inhibit the falling of the displacement absorption member 10. For ease of comprehension, FIG. 10 shows the spring function part 10B of the displacement absorption member 10 alone, with an inverted positional relationship between the separator 2 and the displacement absorption member 10 illustrated in FIG. 9.

The retaining portion 5 shown in the figure has a cubic shape. However, the shape is not particularly limited, and it is formed as a portion of the selected depression part 2B such that it corresponds to the arrangement of the spring function part 10B of the displacement absorption member 10. Such a retaining portion 5 can, for example, be simultaneously formed when the separator 2 is press molded. Therefore, the rear side of the retaining portion 5 has a concave shape.

The retaining portion 5 of this embodiment inhibits the falling of the spring function part 10B of the displacement absorption member 10. Therefore, it is provided in the depression part 2B of the separator 2 disposed on the free end J side of the spring function part 10B, among adjacent separators 2. It is more desirable for the retaining portion 5 to be provided on the anode side separator 2 of the membrane electrode assembly 1.

In the fuel cell stack FS including the configuration described above, the unit cell C is a combination of the separator 2, which has a shape with protrusions and depressions in cross-section and the retaining portion 5, and the displacement absorption member 10. Therefore, the gas passage 3 and the cooling liquid flow space F are efficiently disposed with a predetermined passage area, thereby a thinner unit cell C is achieved. Furthermore, displacement between the unit cells C are absorbed by the displacement absorption member 10, while the retaining portion 5 of the separator 2 inhibit the free end J of the spring function part 10B of the displacement absorption member 10 from falling into the depression part 2B of the separator 2. Therefore, the displacement absorption function of the displacement absorption member 10 sufficiently works.

In this manner, the fuel cell stack FS has a structure, in which a cooling liquid flows between stacked unit cells C, and well maintains a function to absorb displacement between the unit cells C, while size reduction of the unit cell stack is achieved. Moreover, in the fuel cell stack FS, it is not necessary to match the positions of the protrusion part 2A of the separator 2 and the spring function part 10B. Therefore, it is possible to independently design the spring function of the displacement absorption member 10 without being influenced by the flow rate settings of the anode gas or the cathode gas, and the cooling liquid.

Further, in the fuel cell stack FS described above, the displacement absorption member 10 has a thin metallic plate as a raw material. It has the spring function part 10B having a cantilever structure on one side of the substrate 10A, and the spring function part 10B is disposed such that it is oriented laterally with respect to the cooling liquid flow direction. Consequently, at the time of stacking, it is sufficient to form the retaining portion 5 on just one of the adjacent separators 2, and, furthermore, a structure, in which the interference of the flow of the cooling liquid by the displacement absorption member 10 is minimized, is obtained. Moreover, by providing the retaining portion 5 on the anode side separator 2, the influence on the power generation performance can be minimized. This is because the flexibility of designing is higher (more spacious) on the anode side, in which a hydrogen-containing gas with a high activity flows, compared to the cathode side.

Seventh Embodiment

Figure 11:
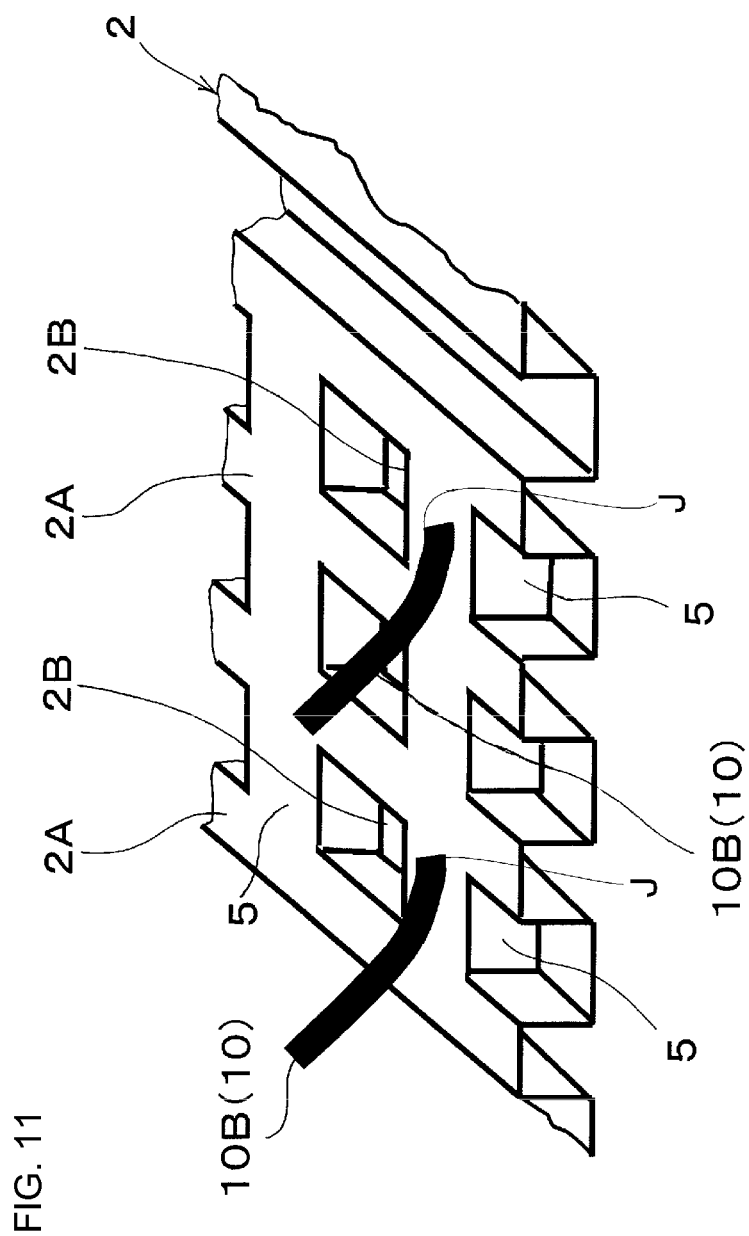
FIG. 11 is a perspective view for explaining a seventh embodiment of the fuel cell stack according to the present invention.

A separator 2 of a fuel cell stack shown in FIG. 11 has a retaining portion (intrusion prevention means) 5, whose protrusion height is the same as that of a protrusion part 2A on the flow space F side, and whose upper surface and the upper surface of the protrusion part 2A are continuous in a co-planar fashion.

In the same manner as the previous embodiments, the fuel cell stack including the separator 2 described above is able to well maintain a function to absorb displacement between the unit cells C, while size reduction of the fuel cell stack is achieved. Furthermore, it is also able to readily cope with the case where the spring function part 10B of the displacement absorption member 10 has a large range of movement.

Eighth Embodiment

Figure 12A:
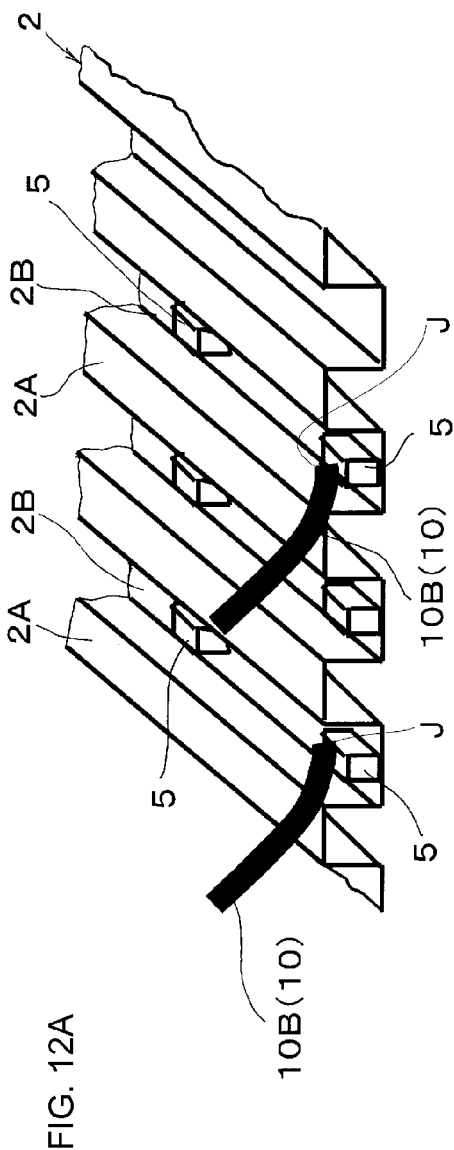
FIG. 12A is a perspective view for explaining an eighth embodiment of the fuel cell stack according to the present invention.
Figure 12B:
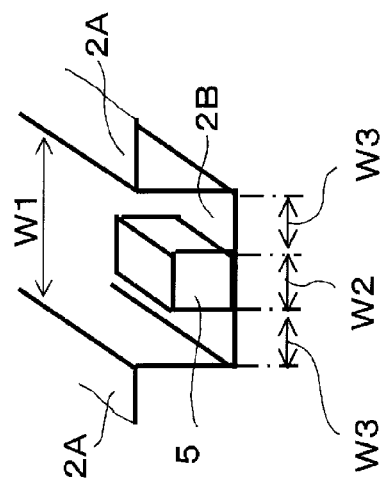
FIG. 12B is an enlarged perspective view of the main parts.

A separator 2 of a fuel cell stack, shown in FIGS. 12A and 12B, has a retaining portion (intrusion prevention means) 5, whose width W2 is smaller than the width W1 of a depression part 2B. In the example shown in the figure, the retaining portion 5 is shorter than the height of a protrusion part 2A, and is provided at the center of the cross-section of the depression part 2B. A space with a certain width W3 is formed on both sides of the retaining portion 5.

In the same manner as the previous embodiments, the fuel cell stack including the separator 2 described above is able to well maintain a function to absorb displacement between the unit cells C, while size reduction of the fuel cell stack is achieved. Furthermore, the falling of the spring function part 10B into the depression part 2B can be inhibited with a minimal retaining portion 5, and pressure loss in the cooling liquid in the flow space F can be reduced.

Ninth Embodiment

Figure 13:
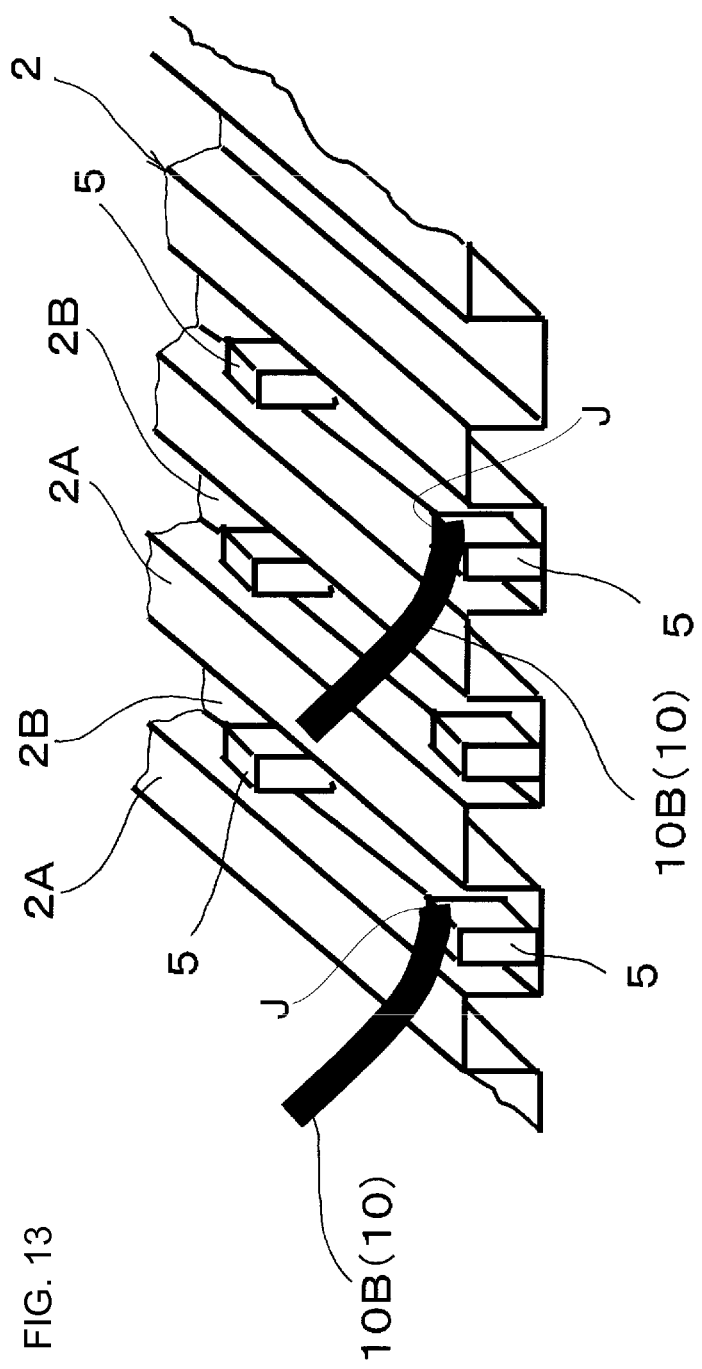
FIG. 13 is a perspective view for explaining a ninth embodiment of the fuel cell stack according to the present invention.

A separator 2 of a fuel cell stack, shown in FIG. 13, has retaining portions (intrusion prevention means) 5 regularly disposed in a depression part 2B. Furthermore, they all have the same shape. In the example shown in the figure, the retaining portions 5 have the same height as a protrusion part 2A and a smaller width than the depression part 2B, and they are provided at the center of the cross-section of the depression part 2B.

In the same manner as the previous embodiments, the fuel cell stack including the separator 2 described above is able to well maintain a function to absorb displacement between the unit cells C, while size reduction of the fuel cell stack is achieved. Furthermore, the pressure loss in the cooling liquid in each depression part 2B becomes the same, and the flow distribution between the depression parts 2B can be improved.

Tenth Embodiment

Figure 14A:
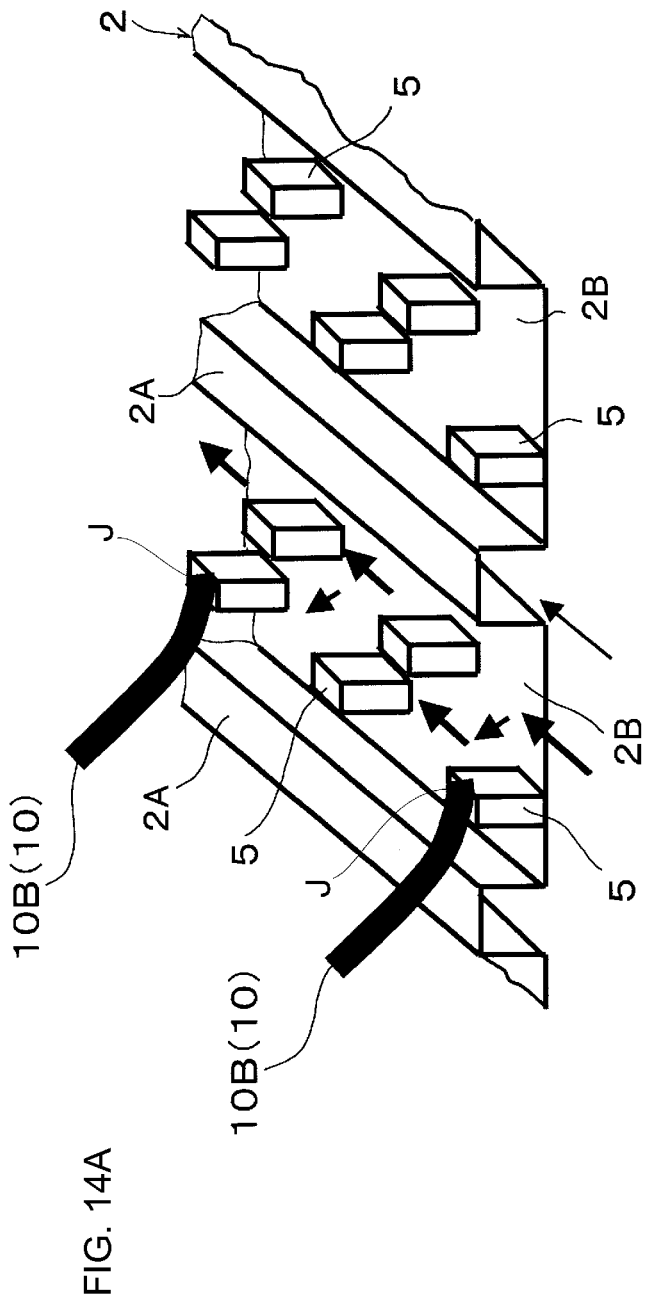
FIG. 14A is a perspective view for explaining a tenth embodiment of the fuel cell stack according to the present invention.
Figure 14B:
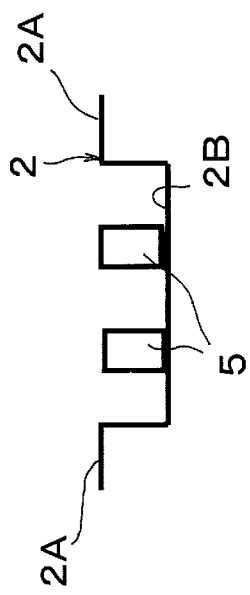
FIG. 14B is an enlarged cross-sectional view of the main parts.

A separator 2 of a fuel cell stack, shown in FIGS. 14A and 14B, has retaining portions (intrusion prevention means) 5 disposed in a laterally alternating fashion at a predetermined interval along the continuous direction (longitudinal direction) of a depression part 2B. In the separator 2 shown in the figure, the width of the depression part 2B is larger compared with the previous embodiments, and a plurality of the retaining portions 5 are disposed in the depression part 2B. The example shown in the figure illustrates a case where two rows of the retaining portions 5 are in the width direction of the depression part 2B, with each row disposed in the longitudinal direction of the depression part 2B. However, it is also possible for more than two rows of the depression parts 2B to be disposed. In that case, the retaining portions 5 are disposed in a laterally alternating fashion in adjacent rows. That is to say, they are disposed such that they are shifted (or offset) in the continuous direction of the depression part 2B.

In the same manner as the previous embodiments, the fuel cell stack including the separator 2 described above is able to well maintain a function to absorb displacement between the unit cells C, while size reduction of the fuel cell stack is achieved. Furthermore, the number of points of stagnation in the cooling liquid flow within the depression part 2B, indicated by the arrows in the figure, is reduced, thereby reducing pressure loss in the cooling liquid.

Eleventh Embodiment

Figure 15:
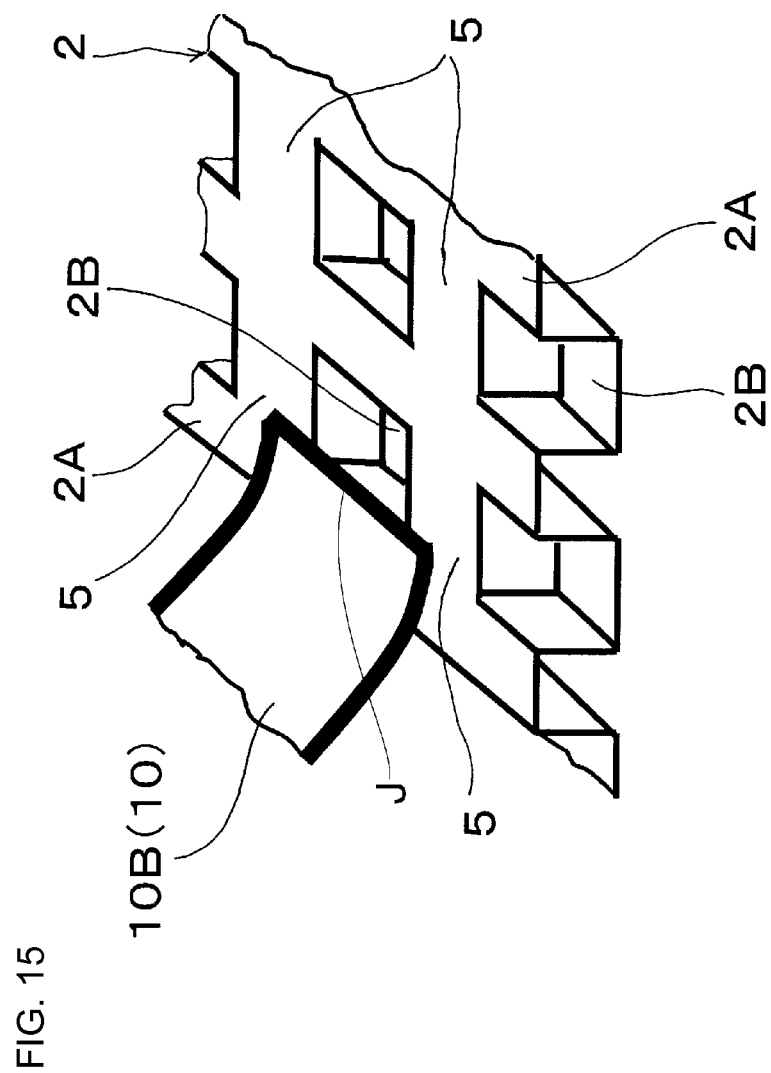
FIG. 15 is a perspective view for explaining an eleventh embodiment of the fuel cell stack according to the present invention.

A separator 2 of a fuel cell stack, shown in FIG. 15, has retaining portions (intrusion prevention means) 5 respectively provided in the continuous direction (longitudinal direction) of a depression part 2B at positions corresponding to both sides of a spring function part 10B of a displacement absorption member 10 in its width direction. In the example shown in the figure, the width of the spring function part 10B is larger compared with the previous embodiments.

In the same manner as the previous embodiments, the fuel cell stack including the separator 2 described above is able to well maintain a function to absorb displacement between the unit cells C, while size reduction of the fuel cell stack is achieved. Furthermore, when the separator 2 has a front/back reversible shape, the influence on the gas passage side can be minimized and the reduction in the passage ratio between the gas passage 3 and the cooling liquid flow space F can be minimized, while falling of the spring function part 10B into the depression part 2B can be prevented.

Twelfth Embodiment

Figure 16:
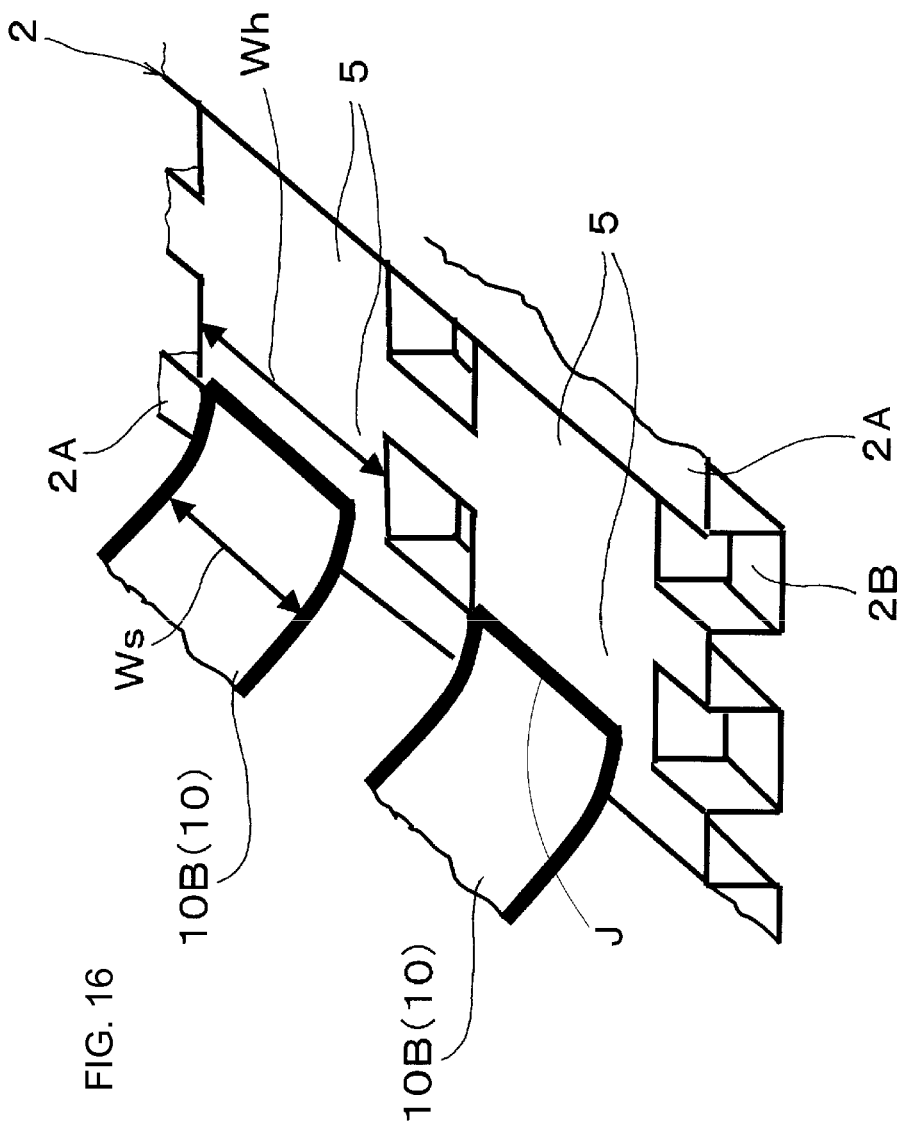
FIG. 16 is a perspective view for explaining a twelfth embodiment of the fuel cell stack according to the present invention.

A separator 2 of a fuel cell stack, shown in FIG. 16, has retaining portion (intrusion prevention means) 5, whose width Wh is larger than the width Ws of a spring function part 10B of a displacement absorption members 10 in the continuous direction (longitudinal direction) of a depression part 2B.

In the same manner as the previous embodiments, the fuel cell stack including the separator 2 described above is able to well maintain a function to absorb displacement between the unit cells C, while size reduction of the fuel cell stack is achieved. Furthermore, the spring function part 10B can be prevented from falling into the depression part 2B with certainty.

Thirteenth Embodiment

Figure 17:
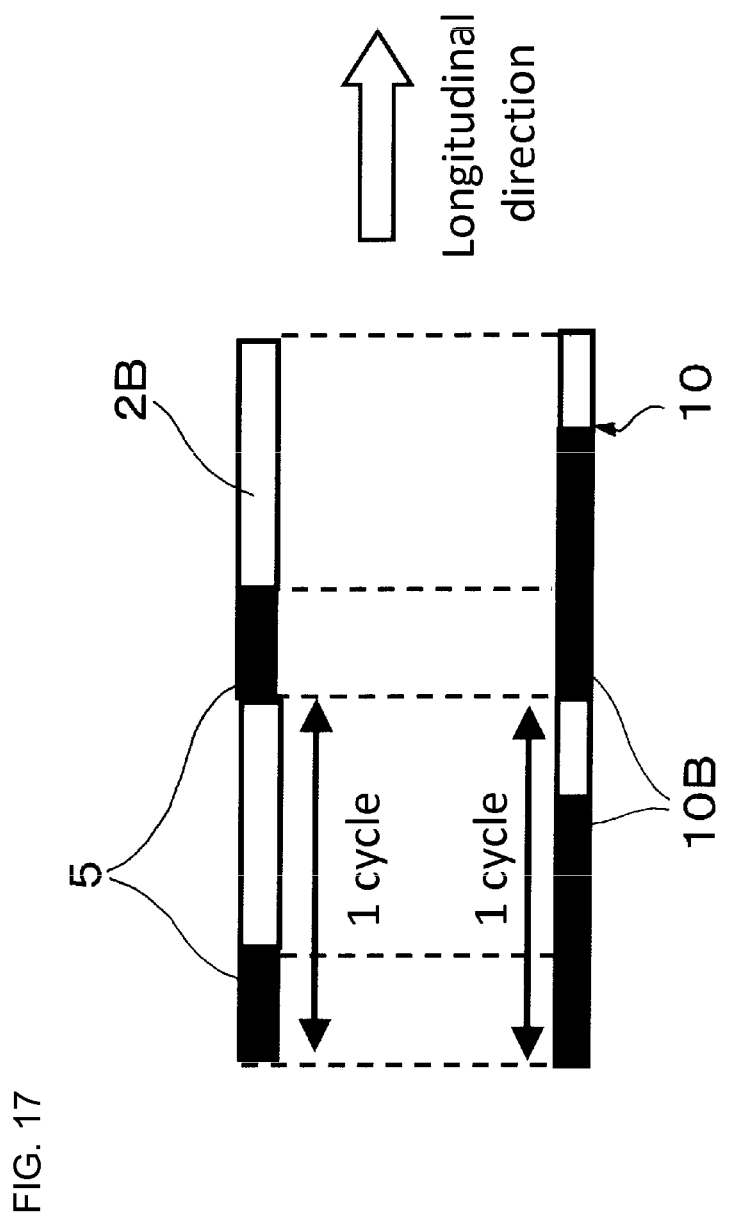
FIG. 17 is an explanatory drawing showing a thirteenth embodiment of the fuel cell stack according to the present invention.

A separator 2 of a fuel cell stack, shown in FIG. 17, has retaining portions (intrusion prevention means) 5 disposed at a predetermined interval, and spring function parts 10B disposed at a predetermined interval, such that the pitch of the retaining portions 5 and the pitch of the spring function parts 10B are equivalent in the continuous direction of a depression part 2B. Here, the pitch of the retaining portions 5 represents the length of one cycle, which is the sum of the width of the retaining portion 5 and the width between adjacent retaining portions 5. Similarly, the pitch of the spring function parts 10B represents the length of one cycle, which is the sum of the width of the spring function part 10B and the width between adjacent spring function parts 10B.

In the same manner as the previous embodiments, the fuel cell stack including the separator 2 described above is able to well maintain a function to absorb displacement between the unit cells C, while size reduction of the fuel cell stack is achieved. Furthermore, the spring function part 10B always contacts with the retaining portion 5 in the continuous direction of the depression part 2B. Therefore, the spring function part 10B can be prevented from falling into the depression parts 2B with certainty.

Fourteenth Embodiment

Figure 18:
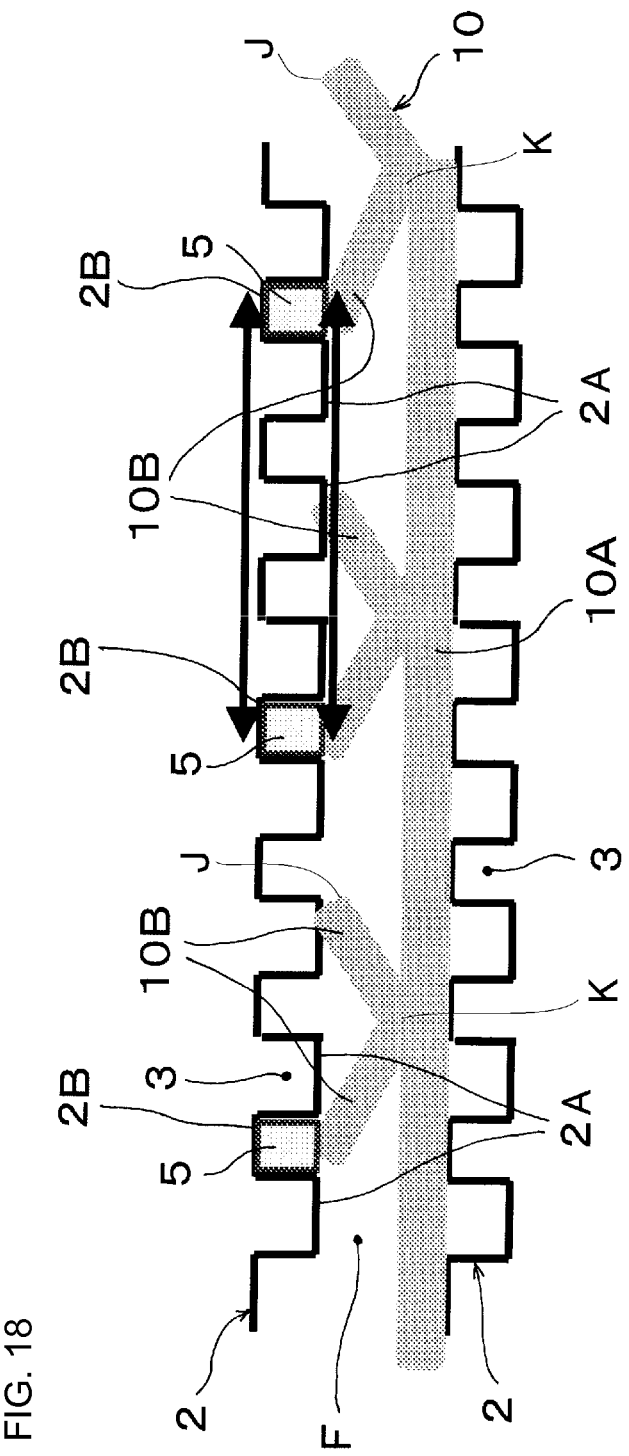
FIG. 18 is a cross-sectional view for explaining a fourteenth embodiment of the fuel cell stack according to the present invention.

A separator 2 of a fuel cell stack, shown in FIG. 18, has retaining portions (intrusion prevention means) 5 disposed at a predetermined interval, and spring function parts 10B disposed at a predetermined interval, such that the pitch of the retaining portions 5 and the pitch of the spring function parts 10B are equivalent in the direction of the arrangement of protrusions and depressions. In the previous embodiment, the pitch represented the length of one cycle in the continuous direction of the depression part 2B. However, in this embodiment, the pitch represents the length of one cycle in the direction of the arrangement of the protrusions and depressions.

In the same manner as the previous embodiments, the fuel cell stack including the separator 2 described above is able to well maintain a function to absorb displacement between the unit cells C, while size reduction of the fuel cell stack is achieved. Furthermore, the spring function part 10B always contacts with the retaining portion 5 in the direction of the arrangement of the protrusions and depressions. Therefore, the spring function part 10B can be prevented from falling into the depression part 2B with certainty.

Moreover, in the fuel cell stack, the above described embodiments illustrated in FIG. 17 and FIG. 18 can be combined. That is to say, by matching the pitch of the retaining portions 5 and the pitch of the spring function parts 10B in both the continuous direction of the depression part 2B and the direction of the arrangement of the depression part, the arrangement of each retaining portion 5 and each spring function part 10B correspond to each other. Therefore, the spring function parts 10B can be prevented from falling into the depression parts 2B with certainty.

Fifteenth Embodiment

Figure 19:
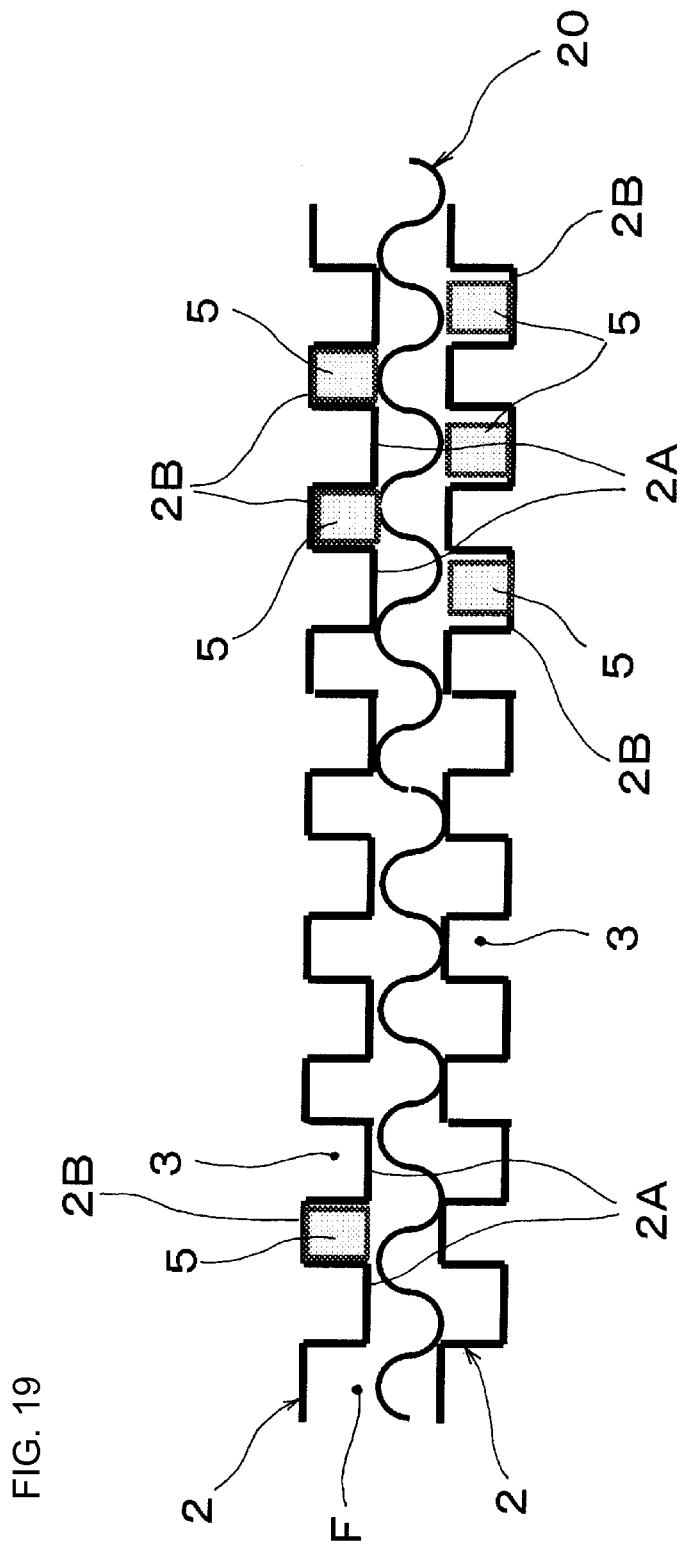
FIG. 19 is a cross-sectional view for explaining a fifteenth embodiment of the fuel cell stack according to the present invention.

A fuel cell stack FS shown in FIG. 19 employs a displacement absorption member 20 with a wave shape in cross-section, while the previous embodiments employ the displacement absorption member 10 in which a plurality of the spring function parts 10B are disposed on one side of the substrate 10A. The contact portion of the displacement absorption member 20 with a separator 2 still moves in the in-plane direction with a deformation in the thickness direction. With this displacement absorption member 20, for example, one end portion or the central portion can be fixed to another member to provide a fixed end. In this case, when one end portion serves as the fixed end, then the other end portion serves as a free end, and when the central portion serves as the fixed end, then both end portions serve as the free ends.

Therefore, the fuel cell stack FS is provided with the retaining portion (intrusion prevention means) 5 in a depression part 2B selected from the depression parts 2B on the flow space F side in the separators 2 of adjacent unit cells C at the time of stacking. The retaining portion (intrusion prevention means) 5 protrudes on the flow space F side and inhibits the falling of the displacement absorption member 20. The fuel cell stack FS has a structure, in which a cooling liquid flows between stacked unit cells C, and well maintains a function to absorb displacement between the unit cells C, while size reduction of the fuel cell stack is achieved.

The configuration of the fuel cell stack according to the present invention is not limited to the embodiments described above, but details of the configuration may be suitably changed within a range that does not depart from the gist of the present invention, and the configuration of the embodiments may also be suitably combined.

The invention claimed is:

1. A fuel cell stack formed by stacking unit cells, each unit cell comprising:
   a membrane electrode assembly sandwiched between a pair of separators, each separator having a depression part and a protrusion part;
   a cooling liquid flow space formed between separators of adjacent stacked unit cells; and
   a displacement absorption member that absorbs displacement between the unit cells disposed in the cooling liquid flow space, the displacement absorption member including a spring part having a free end and a fixed end,
   wherein a separator facing the spring part has an intrusion prevention part formed by the protrusion part that prevents the free end of the spring part from intruding into the depression part of the separator, and
   wherein a width of the free end of the spring part is larger than a width of the depression part of the separator with which the spring part contacts.

2. A fuel cell stack according to claim 1, wherein the displacement absorption member is disposed such that a movement direction of the free end of the spring part matches to a continuous direction of the depression part of the separator, and the free end contacts with the protrusion part of the separator.

3. A fuel cell stack according to claim 1, wherein an upper surface of the protrusion part of the separator is planar.

4. A fuel cell stack according to claim 1, wherein the displacement absorption member has a structure, in which a plurality of spring parts are arranged on one side of a substrate, said spring parts contacting the separator facing the spring part, the substrate contacting an opposing separator opposite the cooling liquid flow space from the separator facing the spring part,
   the spring part has a cantilever structure in which a bottom end is the fixed end fixed to the substrate and a top end is the free end, and
   the width of the free end of the spring part is larger than a width of the protrusion part of the separator with which the spring part contacts.

5. A fuel cell stack according to claim 4, wherein the free ends of the spring parts make contact with a plurality of protrusion parts of the separator with which the spring parts contact.

6. A fuel cell stack according to claim 4, wherein the substrate of the displacement absorption member has an opening on a lower side of each of the spring parts, and the depression part of the separator, with which the substrate contacts, communicates with the opening.

7. A fuel cell stack according to claim 4, wherein the displacement absorption member has the spring parts arranged on the substrate in a continuous direction of the protrusion part and the depression part of the separator, and in a width direction that intersects the continuous direction, and the spring parts that are adjacent in the width direction are shifted in the continuous direction of the protrusion part and the depression part.

8. A fuel cell stack according to claim 4, wherein at least one of the spring parts of the displacement absorption member is disposed in a state where the free end is directed to a downstream side of a cooling liquid flow direction.

9. A fuel cell stack according to claim 1, wherein a cooling liquid flow direction in the cooling liquid flow space and a gas flow direction in a gas passage formed between the membrane electrode assembly and one of the pair of separators are the same.

10. A fuel cell stack according to claim 9, wherein a gas in the gas passage is an anode gas.

11. A fuel cell stack according to claim 1, wherein each separator has a front/back reversible shape.

12. A fuel cell stack formed by stacking unit cells, each unit cell comprising:
    a membrane electrode assembly sandwiched between a pair of separators, each separator having a depression part and a protrusion part;
    a cooling liquid flow space formed between separators of adjacent stacked unit cells; and
    a displacement absorption member that absorbs displacement between the unit cells disposed in the cooling liquid flow space, the displacement absorption member including a spring part having a free end and a fixed end,
    wherein a separator facing the spring part has an intrusion prevention part formed in the depression part on a flow space side of the separator that prevents of the free end of the spring part from intruding into the depression part of a spring facing separator, and
    wherein the intrusion prevention part is a retaining portion that protrudes on the flow space side to prevent the displacement absorption member from falling.

13. A fuel cell stack according to claim 12, wherein the displacement absorption member is disposed such that a movement direction of the free end of the spring part matches to a direction orthogonal to a continuous direction of the depression part of the separator, and the free end contacts with the protrusion part of the separator.

14. A fuel cell stack according to claim 12, wherein the displacement absorption member has a structure in which a plurality of the spring parts are disposed on one side of a substrate, the spring part has a cantilever structure in which a bottom end is the fixed end to the substrate, and a top end is the free end, and the retaining portion is provided in the depression part of the separator disposed on a free end side of the spring parts.

15. A fuel cell stack according to claim 14, wherein the separator provided with the retaining portion is the separator on an anode side of the membrane electrode assembly.

16. A fuel cell stack according to claim 12, wherein the retaining portion has a same protrusion height as the protrusion part on the flow space side of the separator.

17. A fuel cell stack according to claim 12, wherein the retaining portion has a smaller width than the width of the depression part of the separator.

18. A fuel cell stack according to claim 12, comprising a plurality of retaining portions regularly disposed in the depression part of the separator, with each retaining portion having the same shape.

19. A fuel cell stack according to claim 12, comprising a plurality of retaining portions disposed in a laterally alternating fashion at a predetermined interval along a continuous direction of the depression part of the separator.

20. A fuel cell stack according to claim 14, comprising a plurality of retaining portions respectively provided in a continuous direction of the depression part of the separator at positions corresponding to both sides of the spring part of the displacement absorption member in a width direction of the spring part.

21. A fuel cell stack according to claim 14, wherein the retaining portion is larger than a width of the spring part of the displacement absorption member in a continuous direction of the depression part of the separator.

22. A fuel cell stack according to claim 14, comprising a plurality of retaining portions, wherein a pitch of the retaining portions disposed at a predetermined interval and a pitch of the spring parts disposed at a predetermined interval are equivalent in a continuous direction of the depression part of the separator.

23. A fuel cell stack according to claim 14, comprising a plurality of retaining portions, wherein a pitch of the retaining portions disposed at a predetermined interval and a pitch of the spring parts disposed at a predetermined interval are equivalent in a direction of arrangement of the protrusions and depressions of the separator.

* * * * *